United States Patent [19]
Sandford et al.

[11] 4,409,946
[45] Oct. 18, 1983

[54] INTERNAL COMBUSTION ENGINES

[75] Inventors: Geoffrey P. Sandford, Artarmon; Paull A. Alekna, East Lakes, both of Australia

[73] Assignee: Vaporpak Pty. Limited, Artarmon, Australia

[21] Appl. No.: 227,855

[22] Filed: Jan. 23, 1981

[30] Foreign Application Priority Data

Jan. 25, 1980 [AU] Australia .............................. PE2147

[51] Int. Cl.³ ........................................... F02M 31/00
[52] U.S. Cl. .................................. 123/557; 123/549; 123/523; 261/DIG. 83
[58] Field of Search ............... 123/522, 523, 549, 524, 123/557; 261/DIG. 83, 142

[56] References Cited

U.S. PATENT DOCUMENTS

| 781,701 | 2/1905 | Walther | 123/522 |
| 2,742,886 | 4/1956 | McPherson | 123/522 |
| 3,395,681 | 8/1968 | Walker | 123/522 |
| 3,713,429 | 1/1973 | Dwyre | 123/522 |
| 4,011,847 | 3/1977 | Portino | 123/522 |
| 4,040,403 | 8/1977 | Rose | 123/522 |
| 4,271,809 | 6/1981 | Moore | 123/522 |
| 4,352,805 | 11/1982 | Kler | 261/DIG. 83 |

Primary Examiner—Ronald H. Lazarus
Attorney, Agent, or Firm—Ladas & Parry

[57] ABSTRACT

,1 A fuel supply system of an internal combustion engine, the system includes a vessel to provide fuel vapor and a nozzle to mix the vapor with air.

13 Claims, 11 Drawing Figures

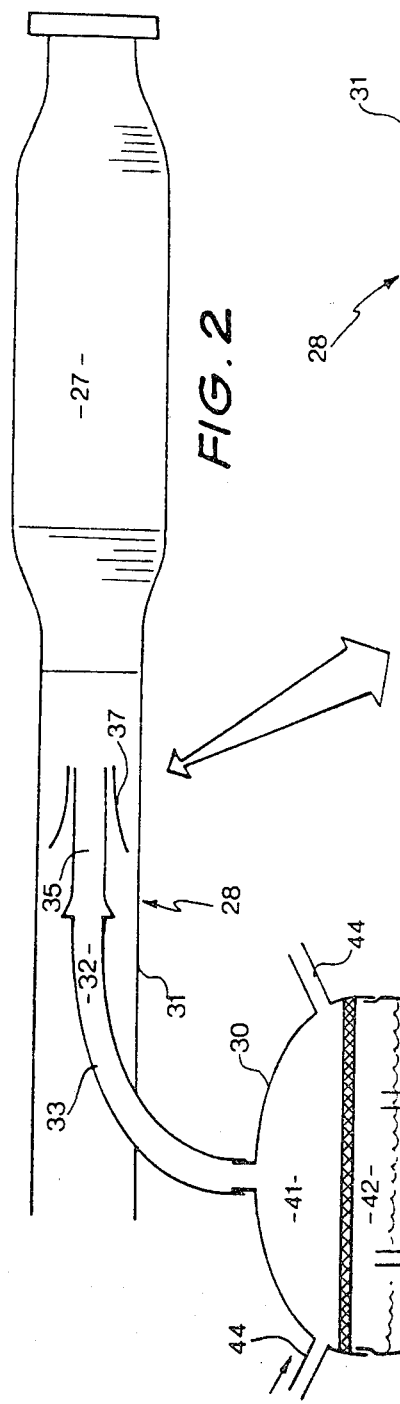
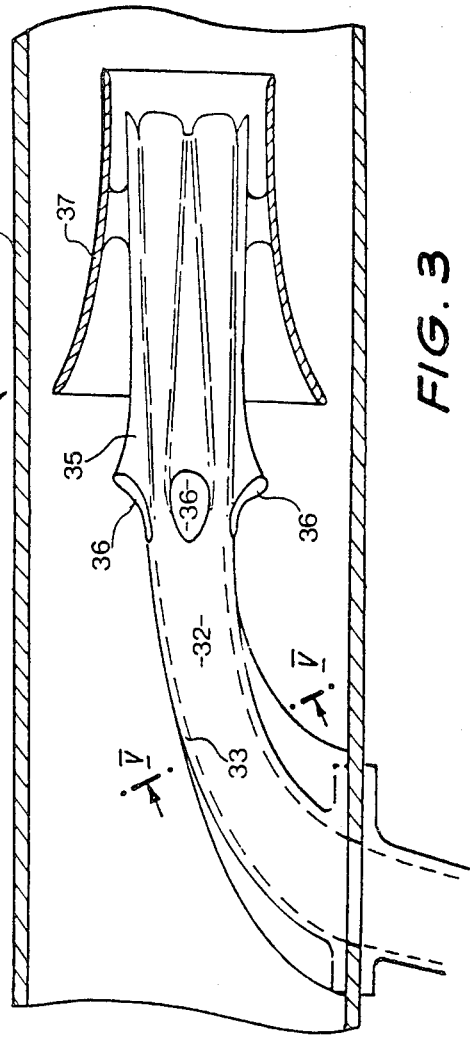
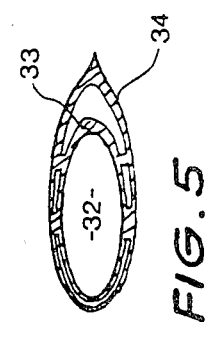

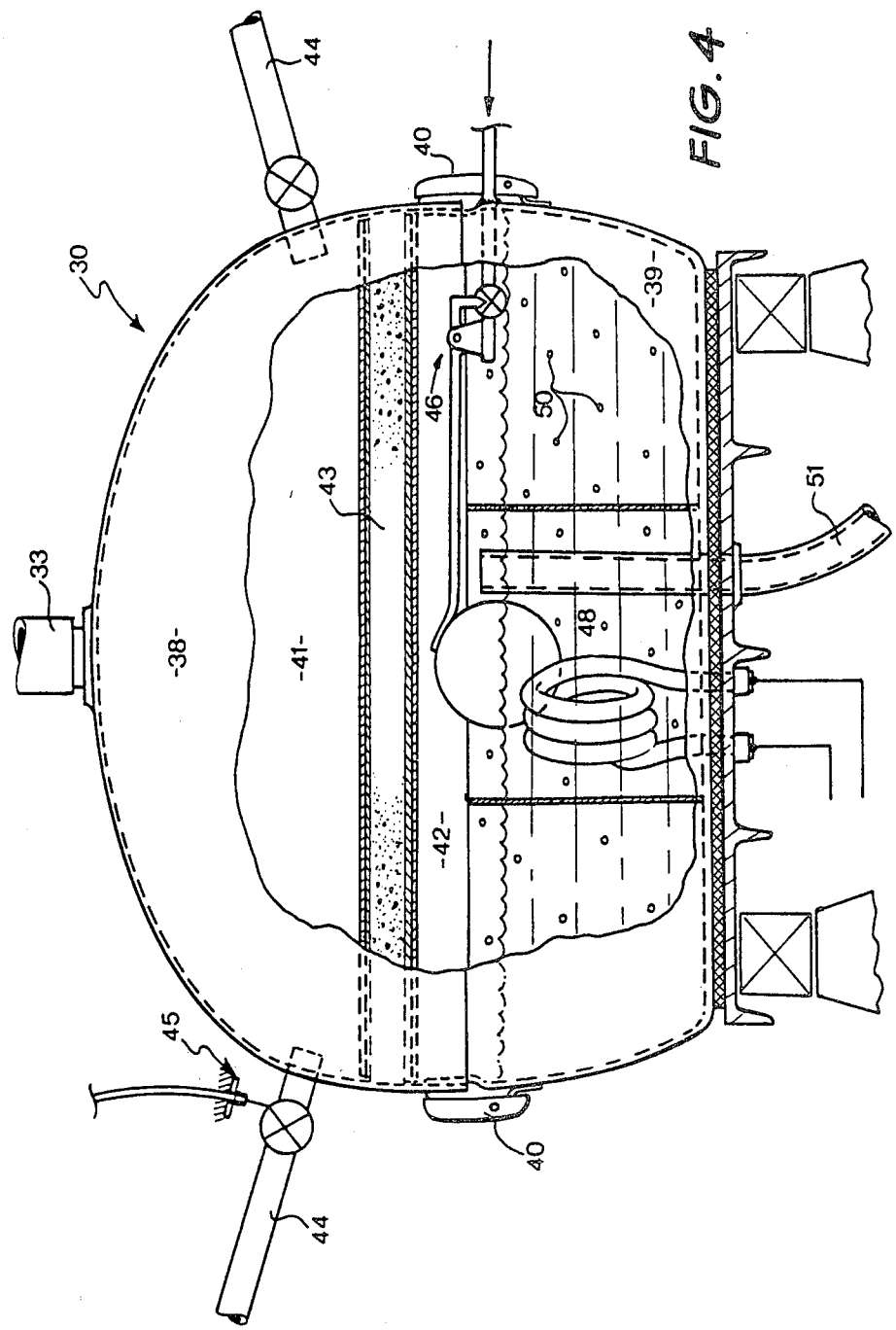

4,409,946

INTERNAL COMBUSTION ENGINES

BACKGROUND OF THE INVENTION

The present invention relates to internal combustion engines and more particularly but not exclusively to internal combustion piston engines.

It has been found by laboratory experiments that with conventional (i.e. non-vaporised carburation) reciprocation internal combustion engines do not even closely approximate the Otto cycle which is the usual theoretical approximation applied to internal combustion engines. This discrepancy is associated with the lengthy period necessary for combustion with the fuel in a liquid state. Usually the flame front associated with such conventional engines only exists for 30° to 50° of rotation of the crank shaft of the engine at normal operating speeds, while combustion still continues for approximately 150° and yet there is still 25% of the fuel still unburnt or partly burnt. Present engines are not an accurate approximation of the Otto cycle, since:

1. Without "instantaneous" combustion, the high pre-expansion pressure and temperature is not reached, thus preventing an adiabatic expansion,
2. The combustion process continues during the pistons down stroke, thus releasing heat. Much of this heat is transferred to the cylinder walls, and as the piston advances towards the bottom of its stroke, an increasing proportion of the heat of combustion becomes waste heat passing through to the exhaust of the engine,
3. There is a substantial loss caused by unburnt and partly burnt fuel.

Still further to the above, high efficiencies are not achievable with conventional engines, since the fuel is not in a vaporised form and accordingly misfiring will occur when air to petrol ratios exceed 20:1.

U.S. Pat. No. 4,137,779 has proposed a solution to the above problems by providing a fuel system wherein the fuel in the petrol tank of a vehicle is heated by the engine coolant. Air is subsequently drawn through the fuel tank to be mixed with the vaporised fuel to provide an air/fuel mixture for the engine. It is a particular disadvantage of this arrangement that the petrol does not remain in a vaporised state, and accordingly condensation occurs on the interior of the conduits leading to the engine. Still further disadvantages are that the fuel to air ratio cannot be accurately controlled and starting and cold running of the vehicle is difficult due to the large volume of petrol to be heated in order to provide sufficient supply of vapor.

SUMMARY OF THE INVENTION

It is an object of the present invention to overcome or substantially ameliorate the above disadvantages.

There is firstly disclosed herein an inductive fuel supply assembly for an internal combustion engine, said assembly comprising a closed vessel adapted to receive liquid fuel, heating elements located within said vessel adapted to heat said fuel to cause vaporisation, a mixing nozzle assembly adapted to receive vaporised fuel and air so as to mix same, first duct means extending between said vessel and nozzle so as to provide for the passage of fuel vapor from said vessel to said nozzle, and second duct means extending to said nozzle so as to deliver air thereto.

There is secondly disclosed herein a vessel to vaporise liquid fuel, said vessel comprising a shell enclosing a chamber to receive said fuel, a filter extending across the interior of said chamber so as to divide said chamber into an upper and a lower chamber portion, baffle means located in said lower chamber portion adapted to inhibit movement of said fuel therein, heating elements located in said lower chamber portion adapted to heat said fuel to cause vaporisation thereof, fuel supply means to deliver the fuel to said lower chamber portion, and wherein said filter is adapted to inhibit the flow of other than fuel vapor from said lower chamber portion to said upper chamber portion.

There is thirdly disclosed herein a mixing nozzle assembly to mix air with fuel vapor, said nozzle assembly including a first duct to receive a flow of air, a nozzle located within said first duct so as to extend generally centrally therealong, a second duct to deliver vaporised fuel to said nozzle, flutes formed in said nozzle to direct moving air within said first duct to the interior of said nozzle, and a venturi surrounding said nozzle and positioned relative thereto so as to create a low pressure region designed to exit of said nozzle.

BRIEF DESCRIPTION OF THE DRAWINGS

A preferred form of the present invention will now be described by way of example with reference to the accompanying drawings, wherein:

FIG. 2 schematically depicts the fuel system employed in FIG. 1 to provide a mixture of petrol vapor and air;

FIG. 3 schematically depicts a mixing nozzle used in the arrangement of FIG. 2;

FIG. 4 is a part sectioned schematic illustration of the vessel in FIG. 2 adapted to provide vaporised fuel;

FIG. 5 is a sectioned view of the nozzle depicted in FIG. 3;

DETAILED DESCRIPTION OF THE PREFERRED EMBODIMENTS

Figure 1:
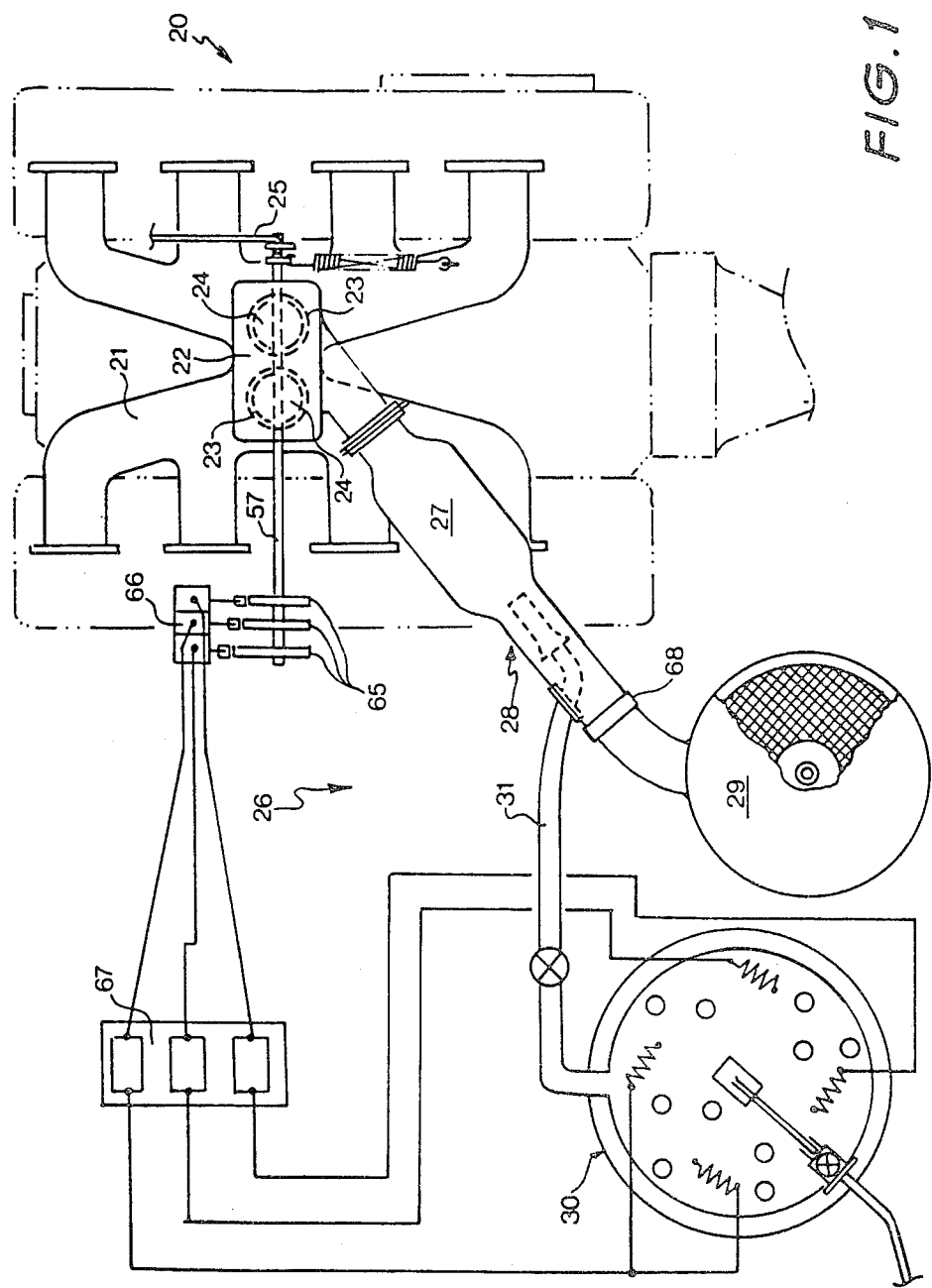
FIG. 1 schematically depicts an internal combustion engine having a fuel supply system which supplies a mixture of air and petrol vapor to the engine.

In FIG. 1 there is depicted an internal combustion engine 20 having an inlet manifold 21 provided with an inlet throat 22. Throat 22 has passages 23 extending therethrough, and within which is located butterfly valves 24 mounted on a shaft 57. The shaft 57 is controlled by throttle linkage 25. Communicating with the throat 22 is a fuel supply arrangement 26 which consists of a spark arrester 27, a mixing nozzle assembly 28, a clean air supply means 29 and a liquid fuel vaporizing vessel 30.

In operation liquid fuel is caused to evaporate in the vessel 30 and is delivered to the mixing nozzle 28 by means of a conduit 31. Within the mixing nozzle 28 the vapor is mixed with air from the air cleaner 29 to provide the throat 22 with a mixture of vaporised fuel and air to be burnt within the engine 20.

Now with reference also to FIGS. 2, 3, 5, 10 and 11, wherein there is depicted the mixing nozzle arrangement 28 which is located within a conduit 31 leading to the spark arrester 27. The mixing nozzle assembly 28 includes an inlet duct 32 which is defined by tube 33 which is shielded by a second tube 34 so as to inhibit the flow of heat from the tube 33. The duct 32 leads to a nozzle 35 which has a plurality of flutes 36 which surround the central portion of the nozzle 35. To further aid mixing, there is surrounding the nozzle 35 a venturi 37. In operation, and at low air flow rates, vapor is drawn through the duct 32 by the transfer of kinetic energy from the air stream passing through the interior of the tube 31 and entering the flutes 36. It should be noted that the flutes 36 are dimensioned so as to increase contact of the fuel vapor with the faster moving air flow to thereby provide for the maximum transfer of kinetic energy to impart motion to the fuel vapor. When the air flow through the conduit 31 increases, the venturi 37 then operates as the primary means of mixing the fuel vapor with the air passing through the conduit 31. In operation air passing between the venturi 37 and the nozzle 35 creates a low pressure area adjacent the exit of the nozzle 35 to thereby draw fuel vapor from within the nozzle 35.

Now with reference to FIG. 4 wherein there is depicted the vaporizing vessel 30. The vessel 30 consists of a shell formed by co-operating upper and lower parts 38 and 39 joined by catches 40 which secure the two halves 38 and 39 together with sufficient force to form a seal therebetween. The device 30 defines an interior chamber divided into an upper half 41 and a lower half 42 which are separated by a filter 43. The upper half 41 is adapted to receive a petrol vapor and air mixture passing through the filter 43, which mixture is to be further mixed with air via means of air inlets 44. One or more of the air inlets 44 may be adjustable by means of a cable and valve arrangement 45 so that the quantity of air entering the half chamber 41 may be regulated. It should be further appreciated that air entering via inlets 44 may be cool or heated air. The lower half chamber 42 is adapted to receive petrol by means of a float valve inlet arrangement 46. The half chamber 42 is also divided into a plurality of spaces 47 by means of intersecting baffle plates 48. The baffle plates 48 are provided with a plurality of small holes 50 which allow petrol to flow between the spaces 47 while inhibiting splashing and excessive movement of petrol within the chamber half 42. Located within four of the spaces 47 are electric heating elements 49 which are adapted to heat the petrol located therein.

Also leading to the interior of the lower half chamber 42 are warm air inlets 51 which deliver warm air to the half chamber 42 above the level of liquid fuel therein to be mixed with the petrol vapor. As a further modification hot air (200° F.) could also be delivered to the inlets 51. The air and petrol mixture then passes through the filter 43 to be further mixed with hot or cool air entering the upper half chamber 41. This further mixture then exits by means of an outlet in the form of tube 33. The filter 43 is provided to inhibit splashing and the rising of petrol other than in the form of vapor. More particularly the filter 43 may be in the form of a metal mesh, cloth fibre, charcoal bed, fibreglass matting or a combination of any one or more thereof.

Figure 7:
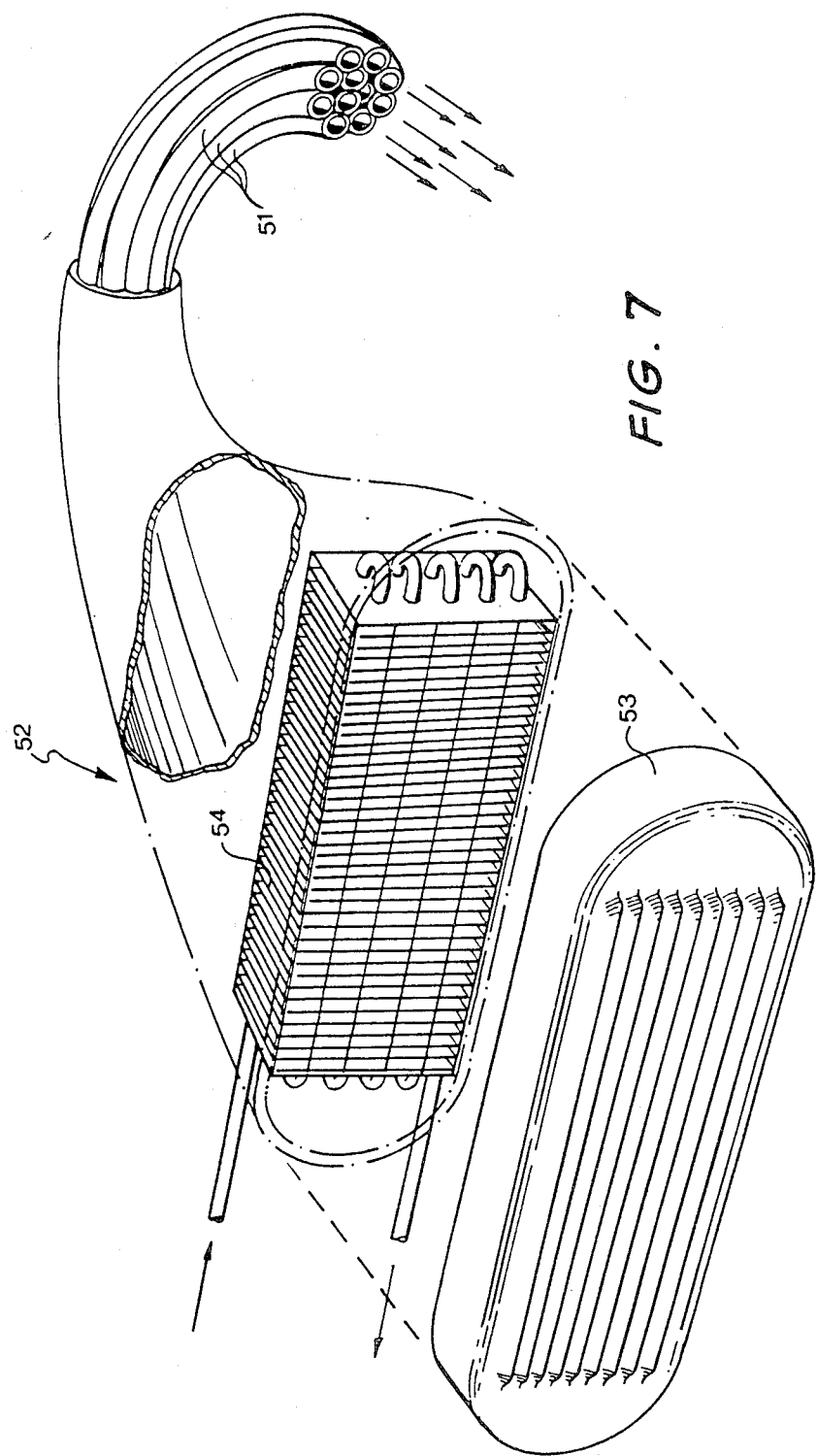
FIG. 7 schematically depicts an air supply system for the arrangement of FIG. 2.

Now with reference also to FIG. 7, there is provided an air supply means 52 for the vaporizing vessel 30. The air supply means 52 includes a filter 53 which provides air to a heat exchanger 54 which receives hot water from the cooling system or exhaust gases from the engine 20. Air, at atmospheric pressure, after passing through the heat exchanger 54 is delivered at substantially atmospheric pressure to ducts 51 which then extend to the vaporizing vessel 30.

Figure 8:
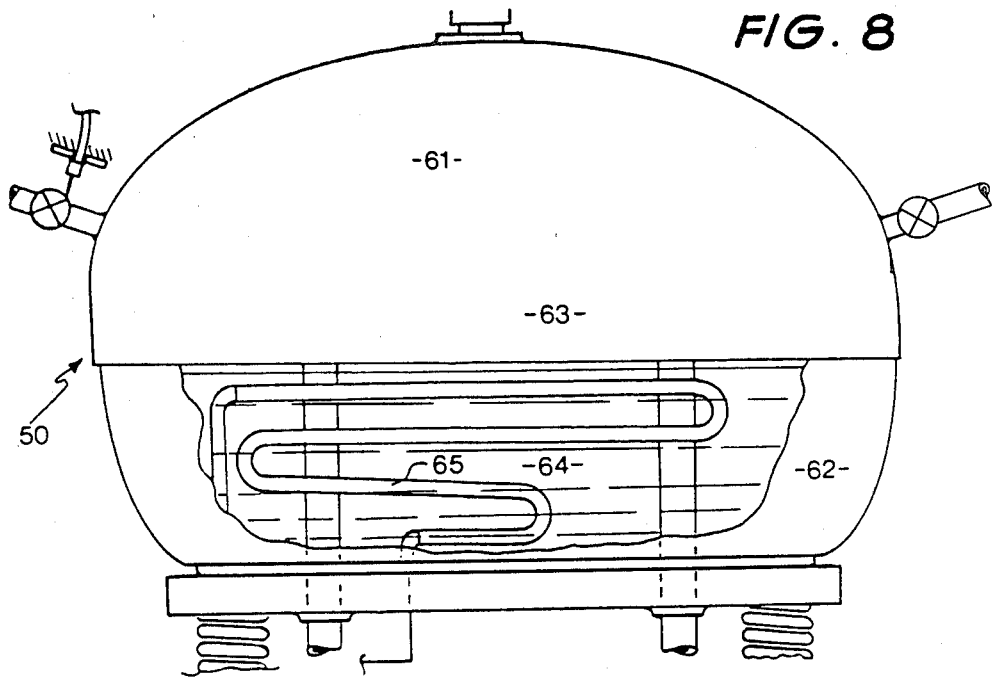
FIG. 8 is a part sectioned schematic side elevation of an alternative vessel to that of FIG. 4.
Figure 9:
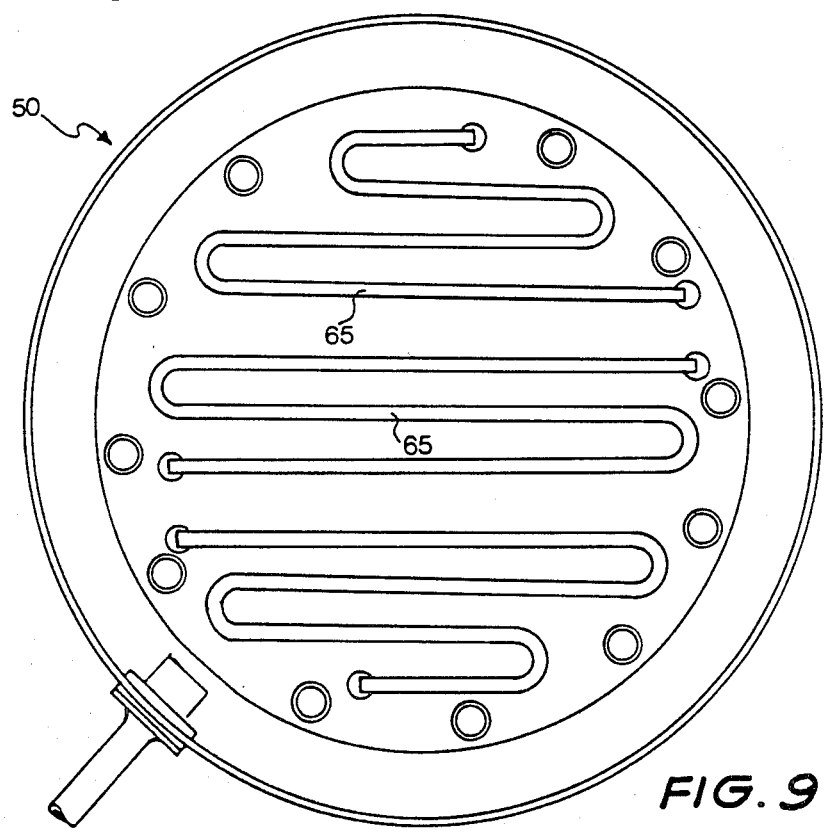
FIG. 9 is a plan view of the vessel of FIG. 8 with the top portion removed.
Figure 10:
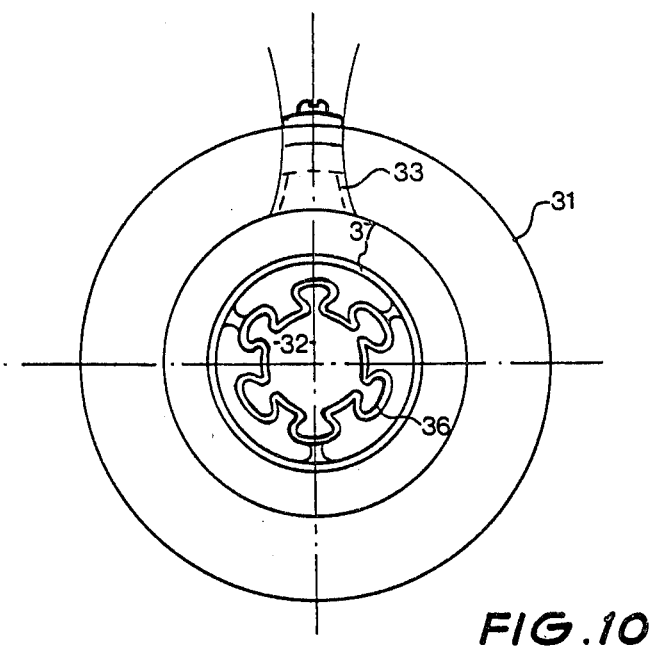
FIG. 10 is a first end elevation of the nozzle of FIG. 2.
Figure 11:
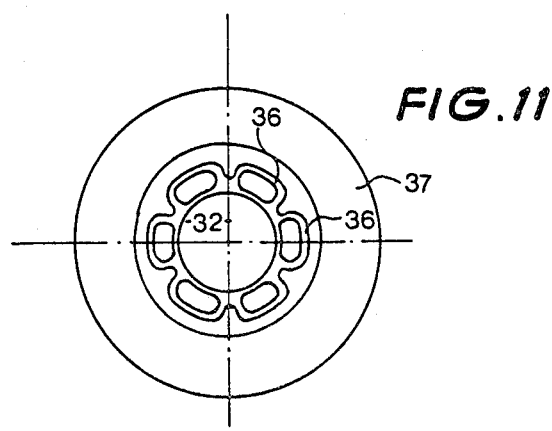
FIG. 11 is a further end elevation of the nozzle of FIG. 2.

Turning now to FIGS. 8 and 9 wherein there is depicted an alternative vaporizing vessel 50 to that depicted in FIG. 4. The vessel 50 is similar to that of FIG. 4 in that it consists of an upper shell 61 coupled to a lower shell 62 which co-operate to define an upper chamber 63 and a lower chamber 64. The lower chamber 64 is filled with aluminium or rubber foam through which pass immersion heating elements 65. The foam (not depicted) is permeable so as to allow the passage of petrol therethrough and the exit of vapor from the lower chamber 64. The foam is provided in order to inhibit an explosion should the vessel 50 be subject to an impact and rupture. Liquid fuel would be delivered to the vessel 50 by means of an electrically controlled valve governed by electronic wetness detectors located within the lower chamber 64 which would regulate the level of the petrol so as to be just below the upper level of the foam.

Figure 6:
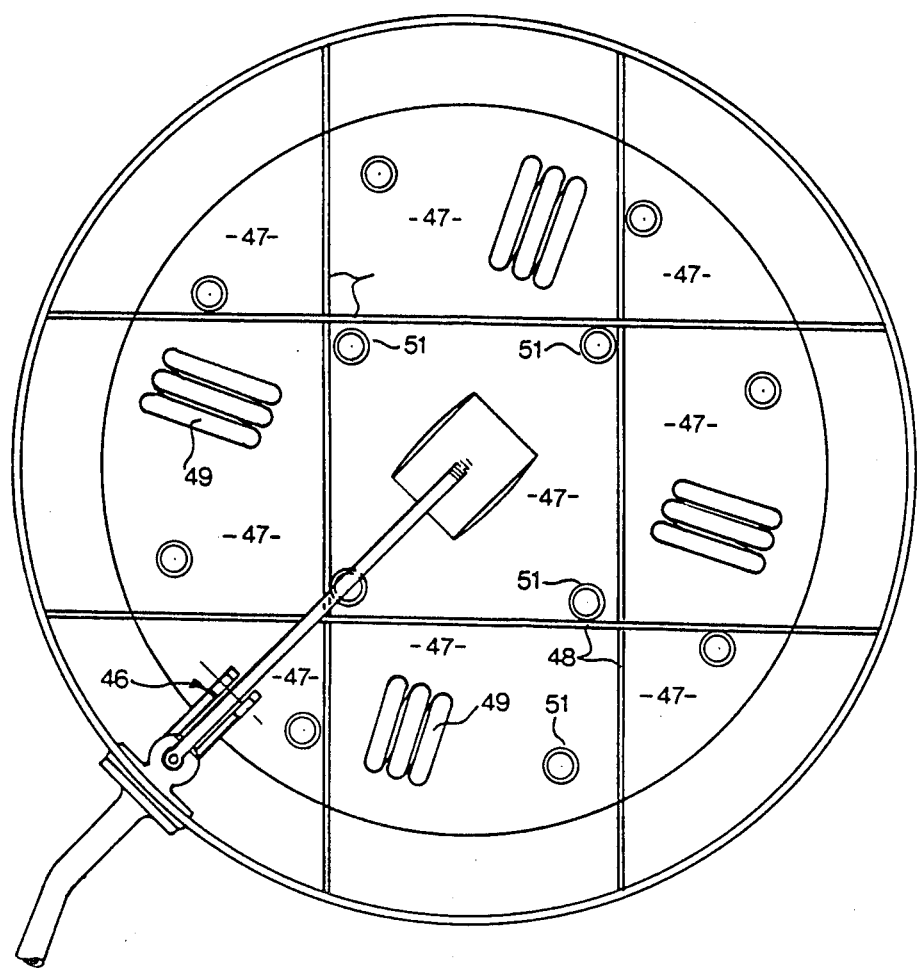
FIG. 6 is a plan view of the vessel of FIG. 4 with its top half removed.

Referring now again to FIG. 1, the embodiment previously described may be modified by individually controlling the heating elements 49 of FIG. 6. As an example a series of cams may be provided on the shaft 57 forming part of the throttle, with the cams 65 arranged to sequentially operate switches 66 which control relays 67 which in turn provide current to the heating elements 49. Thus at high throttle settings, more of the heating elements would be activated to provide a greater quantity of vapor.

Turning now to FIG. 2, in this particular embodiment, petrol vapor is mixed with warm air to approximately the ratio of 1:1 in the lower half chamber 42. Cool or hot air is then added to the chamber 41 to provide an air to petrol ratio of approximately 2:1. The mixture passing through the tube 32 is further mixed with cool air via the flutes 36 to provide an approximate ratio of 4:1 and then again with air via the funnel 37 to provide an approximate ratio within the range of 15:1 to 20:1. The remainder of the cool air passing through the conduit 31 brings the ratio of the mixture within the range of 40:1 to 50:1.

The flow rate of air through the conduit 31 is preferably governed at least partly by an iris 68. For larger capacity engines it may be desirable to have a further mixing to increase the vapour to air ratio by delivering cool air to the throat 22. Preferably a butterfly valve would govern this further delivery of air so that it would be restricted when the engine was cold to thereby provide a richer mixture. In this latter form the mixture of air to the vapour entering the spark arrestor would be in the vicinity of 20:1.

Now with reference also to FIG. 3 it should be appreciated that the fuel to air ratio of the mixture leaving the conduit 31 is governed by the diameter ratio of the venturi 37 and the conduit 31. That is the larger the venturi diameter the richer the mixture entering the spark arrestor.

What we claim is:
1. An inductive fuel supply for an internal combustion engine, said assembly comprising a closed vessel adapted to receive liquid fuel to cause vaporization thereof, a mixing nozzle assembly adapted to receive and mix fuel and air, a first duct extending between said vessel and nozzle so as to provide for the passage of fuel from said vessel to said nozzle, second duct means extending to said nozzle so as to deliver air thereto, said vessel having a shell enclosing a chamber to receive said fuel, a filter extending across the interior of said chamber so as to divide said chamber into an upper and a lower portion, said filter being adapted to inhibit the flow of other than fuel vapor from said lower chamber portion to said upper chamber portion, baffle means located in said lower chamber portion adapted to inhibit movement of said fuel therein, heating elements located in said lower chamber portion adapted to heat said fuel to cause vaporization thereof, fuel supply means to deliver the fuel to said lower chamber portion and air delivery means adapted to deliver air to the interior of said vessel at a location above the liquid fuel level therein.

2. The assembly of claim 1 in which the air delivery means delivers air at substantially atmospheric pressure.

3. The assembly of claim 1 wherein a number of said heating elements are sucessively activated with increasing throttle setting of the engine.

4. The assembly of claim 1 further including an iris located within said second duct means adapted to control the flow of air therethrough.

5. The assembly of claim 1 further including air delivery means operatively associated with said vessel, so as to deliver air to the interior thereof to be mixed with said vapor.

6. The assembly of claim 5 wherein said vessel is divided by a filter into an upper and lower chamber portion, fuel supply means for said vessel adapted to deliver fuel to said lower chamber at a predetermined rate so that the fuel level within said lower chamber is controlled so as to be at a predetermined level, said air delivery means adapted to deliver heated air to said lower chamber portion, and said heating elements are located within said lower chamber portion.

7. The assembly of claim 6 wherein said air delivery means is also adapted to deliver air to said upper chamber portion.

8. The assembly of claim 1 wherein said nozzle assembly includes a nozzle which receives the vapor, said nozzle having means to direct air to the interior thereof so as to aid the flow vapor through the nozzle by the transfer of kinetic energy.

9. The assembly of claim 8 wherein said nozzle assembly includes a venturi surrounding said nozzle, said venturi being adapted to create a low pressure region adjacent the nozzle exit to aid the flow of vapor through said nozzle.

10. The assembly of claim 1 wherein said air delivery means includes at least one conduit terminating within said lower chamber portion so as to deliver air thereto.

11. The assembly of claim 1 wherein said air delivery means includes at least one conduit terminating within said upper chamber portion so as to deliver air thereto.

12. The assembly of claim 1, 10 or 11 wherein said baffle means are a plurality of intersecting baffle plates or a foamed permeable material.

13. The assembly of claim 1 wherein said mixing nozzle assembly includes a first duct to receive a flow of air, a nozzle located within said first duct so as to extend generally centrally therealong, a second duct to deliver vaporised fuel to said nozzle, flutes formed in said nozzle to direct moving air within said first duct to the interior of said nozzle, and a venturi surrounding said nozzle and positioned relative thereto so as to create a low pressure region designed to exit of said nozzle.

* * * * *